UNITED STATES PATENT OFFICE.

SAMUEL M. McMURRAY, OF SMYRNA, AND JAMES R. PARRISH, OF NASHVILLE, TENNESSEE.

PIGMENT-POWDER AND PROCESS OF MAKING THE SAME.

1,215,293.   Specification of Letters Patent.   Patented Feb. 6, 1917.

No Drawing.   Application filed February 3, 1916.   Serial No. 75,907.

*To all whom it may concern:*

Be it known that we, SAMUEL M. McMURRAY and JAMES R. PARRISH, citizens of the United States, and residents of Smyrna, in the county of Rutherford, and of Nashville, in the county of Davidson, State of Tennessee, respectively, have invented certain new and useful Improvements in Pigment-Powders and Processes of Making the Same, of which the following is a specification.

Our invention relates to improvements in the manufacture of pigment powders, and it consists in the composition of matter and the steps taken in preparing the same, set forth in the following specification and more particularly pointed out in the appended claims.

An object of our invention is to provide a pigment powder to be used in connection with an ink, such as printers' ink or stamp pad ink to bring out or intensify the impression made with the ink, and also to render said impression resistant to the action of gasolene.

A further object of our invention is to provide a pigment powder which can be made from materials that cost relatively little and are easily available.

A further object of our invention is to provide a process for preparing the pigment powder which insures the proper consistency of the product.

Other objects and advantages will appear in the following specification, and the novel features of the invention will be particularly pointed out in the appended claims.

In carrying out our invention we take glucose or other saccharine matter and mix it with a coloring matter, such as lamp black, charcoal, black oxid of manganese, or other metallic oxids or sulfids. About one per cent. of oil of wintergreen and enough water to make a pliable mixture is added in addition to the ingredients mentioned.

The ingredients are thoroughly stirred together so as to make a homogeneous plastic mass and then the mixture is dried, preferably on steam pipes, after which the dried product is finally pulverized.

To this pulverized mixture we add five to twenty per cent. cornstarch or other inert powder of like properties, to prevent packing in the can or container in which the powder is put up, and furthermore to prevent excessive smearing.

We have found that the following proportions work well in practice, but it is understood that in giving these proportions we do not mean to say that other proportions will not work, because we are aware that variations may be made in the exact proportions claimed hereinafter without departing from the spirit and scope of the invention. Our preferred formula is:

Glucose or other saccharine matter _____ 1 part
Powdered coloring matter _____ 3 parts
Inert powder, such as cornstarch_ 5 to 20%
Oil of wintergreen _____ 1%

The product prepared as described above may be sprinkled from the can on moist ink impressions made by a stamp pad or by type, in order to give color to said impressions, or to heighten the effect. Primarily the use is to protect these impressions against the action of gasolene or other volatile solvents that are ordinarily used to clean the tracing linen or sheet upon which the draftsman or engineers, or anyone else who may be engaged in making impressions such as those effected by drafting instruments, stamp pads, type, and the like.

We desire to call attention to the fact that our preparation is not to be classed with inks, but is a pigment which is to be used in connection with an ink to intensify the impression made by the latter and also to render the impression resistant to the action of gasolene.

To this end the glucose or other saccharine matter serves a double function, to wit: It forms a mucilaginous substance which readily adheres to the impression and it has the property of rendering the impression resistant to the action of gasolene. Since the coloring matter is merely for the purpose of imparting the necessary color to the pigment, it is obvious that any suitable coloring matter may be used without departing from the spirit or scope of the invention.

Another important use to which the pigment powder is put, is in the making of blue prints. Thus, an impression which ordinarily would not make good blue prints, when treated with the pigment powder will make clear and distinct blue prints with the white lines clearly brought out against the blue background.

We claim:—

1. The herein described pigment powder for intensifying impressions and rendering them resistant to the action of gasolene, which consists of a mixture of a saccharine substance, a coloring matter, and an inert filler.

2. The herein described composition of matter for intensifying inked impressions and rendering said impressions resistant to the action of gasolene, which consists of a mixture of a saccharine substance, a coloring matter, and an inert filler, said mixture being in the form of a fine, dry powder homogeneous throughout.

3. The herein described composition of matter for rendering inked impressions resistant to the action of gasolene, which consists of a mixture of a saccharine substance, a coloring matter, and an inert filler in the proportions of one part of the saccharine substance, three parts of the coloring matter, and five to twenty per cent. of the inert filler.

4. The herein described composition of matter for rendering inked impressions resistant to the action of gasolene and for intensifying said impressions, which consists of a mixture of one part of glucose, three parts of lamp black, and twenty per cent. of starch.

5. The herein described process of preparing a pigment powder which consists in mixing together a saccharine substance and a coloring matter, treating the mixture with water to render the mixture plastic, drying the mixture, powdering the same, and adding an inert filler.

SAMUEL M. McMURRAY.
JAMES R. PARRISH.

Copies of this patent may be obtained for five cents each, by addressing the "Commissioner of Patents, Washington, D. C."